(No Model.)
E. S. LEAYCRAFT.
SPROCKET CHAIN.
No. 601,347.  Patented Mar. 29, 1898.
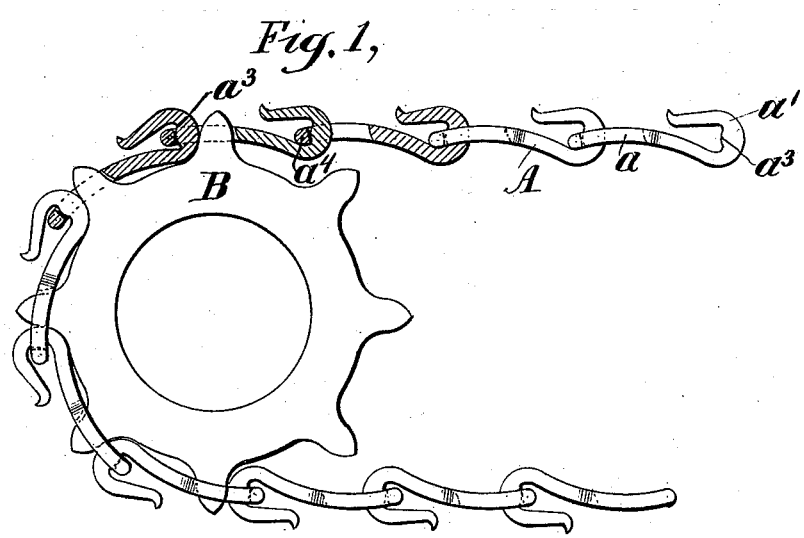
Fig. 1,
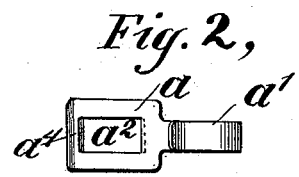
Fig. 2,
WITNESSES:
INVENTOR,
Edwin S. Leaycraft,
BY Pierson L. Wells,
HIS ATTORNEY.

UNITED STATES PATENT OFFICE.

EDWIN S. LEAYCRAFT, OF JERSEY CITY, NEW JERSEY.

SPROCKET-CHAIN.

SPECIFICATION forming part of Letters Patent No. 601,347, dated March 29, 1898.

Application filed December 17, 1896. Serial No. 615,972. (No model.)

*To all whom it may concern:*

Be it known that I, EDWIN S. LEAYCRAFT, of Jersey City, New Jersey, have invented a certain new and useful Improvement in Sprocket-Chains, of which the following is a specification.

The contacting surfaces of the several jointed links comprised in the usual link-belt or sprocket-chain construction slide upon each other more or less during the use of the belt or chain. As each link passes onto the periphery of the engaging wheel it assumes a more and more angular position with relation to its fellow, or if its motion be in the opposite direction the existing angularity is decreased. Either of these two motions of the chain will result in the sliding of the surfaces at the point of articulation upon each other in all forms of chains with which I am acquainted. From this operation friction necessarily arises between the moving surfaces, the degree of which may be considerable when the surfaces are not smooth and the chain is transmitting power. Generally these surfaces are closely fitted together and dirt, grit, or other foreign material getting in between them greatly augments the friction.

It is a purpose of the present invention to provide a link-belt or sprocket-chain construction in which the friction or resistance that arises at the various points of articulation is that of two surfaces rolling upon each other in contradistinction to two surfaces sliding over each other.

Rolling friction is generally recognized as being far less hurtful than sliding friction in that it offers less resistance to motion. Furthermore, there is not the necessity for lubrication where two surfaces roll upon each other that exists where one surface slides over another. This absence of a necessity for a lubricant is especially advantageous where the sprocket-chain is used for a bicycle, to which use the present invention is particularly applicable, since the lubricant attracts dust and dirt the presence of which increases the friction between the joints of the belt.

The invention also embraces a form of link which may be struck up in one piece from a blank and which embodies in itself means for connecting it to the two contiguous links.

I will describe a link belt or sprocket-chain in which are embodied the features of my improvement, defining subsequently the novelty of the same in claim.

In the accompanying drawings, Figure 1 is a side view of a series of jointed links which are represented as passing over a portion of the periphery of an engaging sprocket-wheel. Portions of this view are shown in section.
Fig. 2 is a plan view of one of the links.

Similar letters of reference designate corresponding parts in both figures.

In making a sprocket-chain according to my improvement I form the several links from sheet metal, striking each link up from a suitable blank. Each link A comprises a body portion $a$ and a shank $a'$, extending therefrom. This shank is bent over upon itself to form a loop, the free end of the shank terminating adjacent to the base of the same.

The body portion $a$ is provided with a central aperture $a^2$, through which the tooth of the sprocket B may protrude.

The contacting surfaces of any pair of connected links are so formed that when one link of a pair rocks relatively to the other link the motion is that of one surface rolling upon another.

In the present instance the surface at the bottom of the bight formed by the bent shank $a'$, or that surface against which the engaged link impinges, is convex, as shown at $a^3$, while the inner surface of the cross-piece $a^4$ at the extremity of the aperture $a^2$ is flattened, as seen in cross-sectional view.

The relative motion of the links is readily seen from an inspection of Fig. 1.

The several links in those portions of the belting situated between the driving and driven wheel are arranged in line with each other, the cross-piece $a^4$ of each link resting in a recess at one side of the convex portion $a^3$ of the link in advance, as plainly shown in Fig. 1. When one link rocks relatively to its connected link, the surfaces instead of sliding on each other roll one upon the other.

Preferably the free extremity of the shank $a'$ is brought down to a point which leaves a space for the insertion of the next link a little less than the thickness of the cross-piece $a^4$, this latter being readily sprung into place, as the link is designed to be made of resilient material. Furthermore, the length of the aperture $a^2$ is less than the length of the hook of the shank, so that to slip the cross-piece $a^4$ into the bight of the loop it is necessary to point one link in the opposite direction to that which it will assume when in engagement. This construction will preclude the accidental disengagement of the links.

Having described my invention, what I consider as new, and desire to secure by Letters Patent, is—

A link for a sprocket-chain consisting of a single sheet of metal having a body portion having an aperture provided with a plane bearing-surface, said aperture being adapted to engage the looped shank of a contiguous link, and a shank portion projecting from the body portion and bent upon itself to form a loop adapted to engage the aperture in the body portion of a contiguous link, said looped shank having integrally therewith a vertically-convex bearing-surface adapted to contact with the plane bearing-surface of the apertured body portion of a contiguous link, the bent-over portion of the loop being of greater length than the aperture in the body portion, substantially as specified.

In testimony whereof I have signed my name to this specification in the presence of two subscribing witnesses.

EDWIN S. LEAYCRAFT.

Witnesses:
PIERSON L. WELLS,
ALBERT P. WELLS.